3,343,311
Patented Sept. 26, 1967

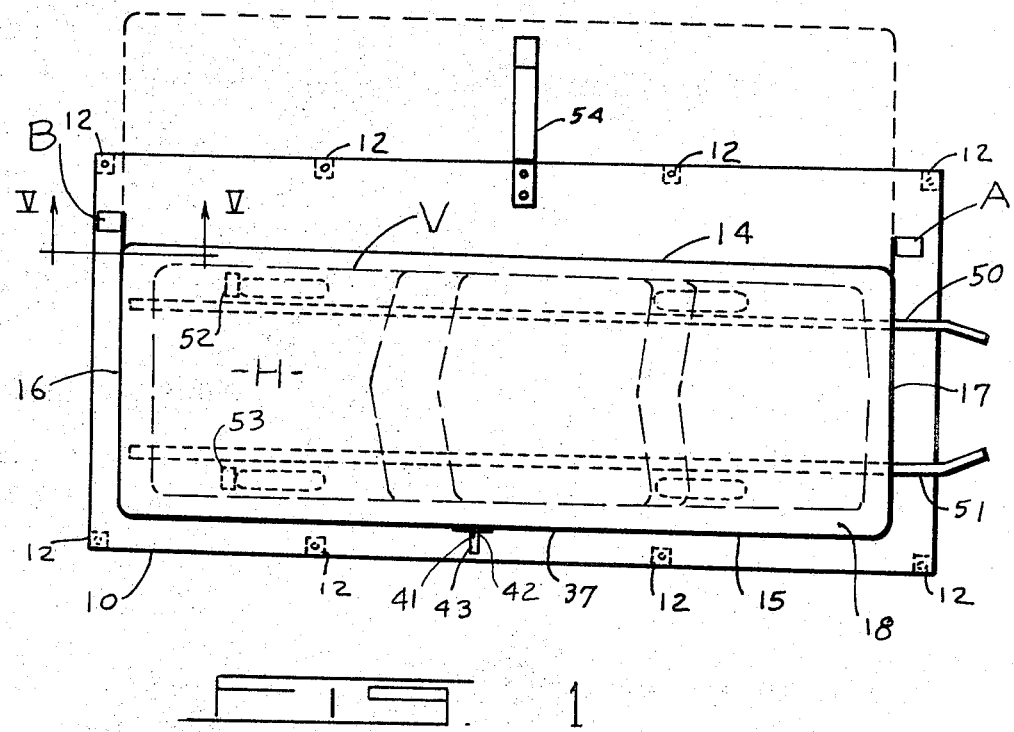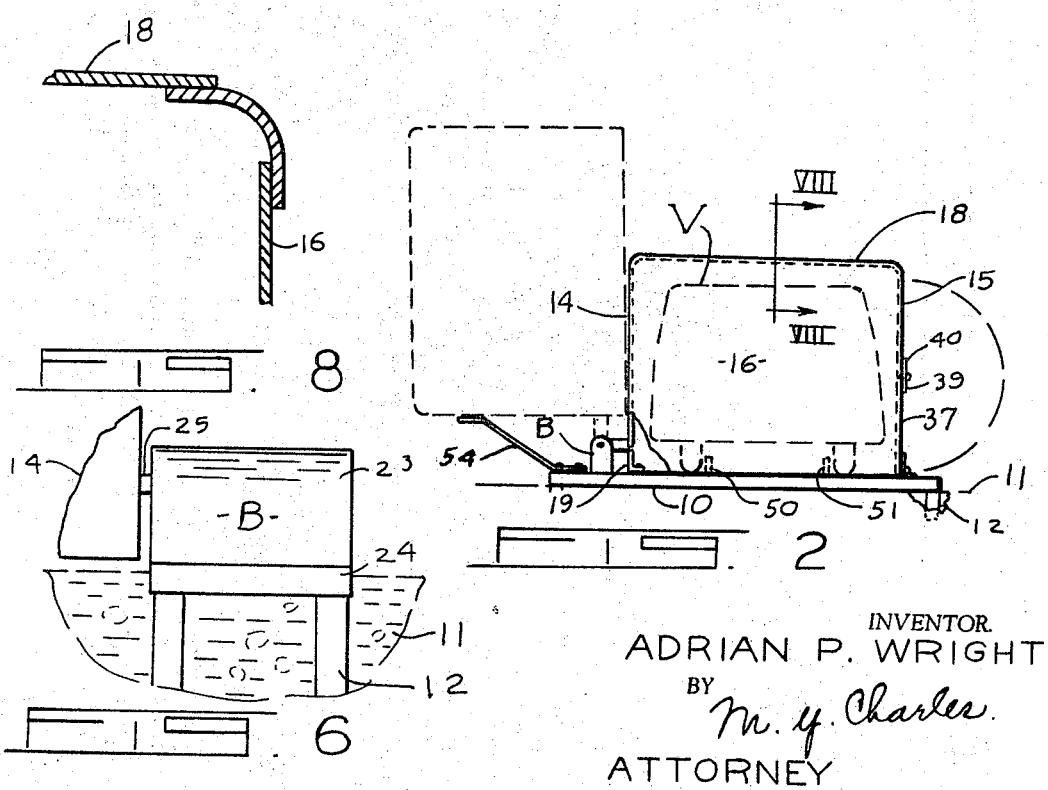

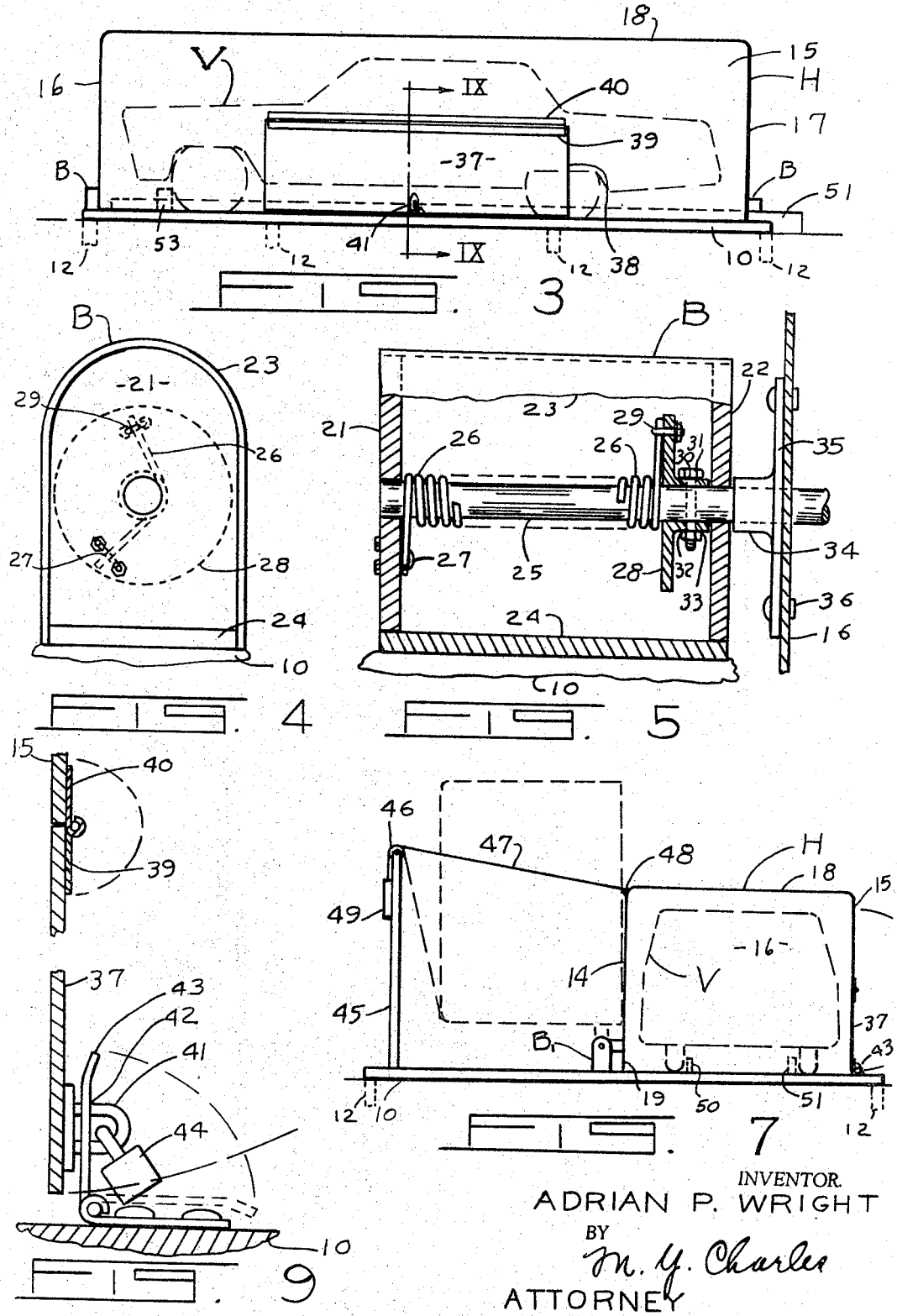

3,343,311
TIPPABLE PROTECTIVE COVERINGS FOR VEHICLES
Adrian P. Wright, 200 N. Merician,
Valley Center, Kans. 67147
Filed June 28, 1965, Ser. No. 467,570
5 Claims. (Cl. 52—66)

ABSTRACT OF THE DISCLOSURE

This disclosure is of a light weight tippable covering for vehicles or any articles needing protection from the elements, or storage.

My invention relates to an improvement in tippable protective coverings for vehicles, storage and similar purposes. An object of the invention is to provide a protective coverage device of the kind mentioned that is light in weight and therefore one that is easy to handle. Another object of the invention is to provide a structure that is strong and is susceptible to being easily moved if necessary. A still further object of the invention is to provide a structure of the kind mentioned the shape of which will conform a considerable degree to the object or articles that are to be covered or stored therein. This makes it possible to minimize the size of the structure and still serve the purpose for which the structure is to be used, and this also minimizes the amount of material required to construct the structure and this also tends to decrease the cost of the structure. A still further object of the invention is to provide a structure of the kind mentioned that has hinged panel portions what will open so as to provide operative room in the structure so that the size of the structure can be still further reduced without reducing the size of the article or material to be housed within structure. A still further object of the invention is to provide a tippable structure of the kind mentioned in which the hinged wall of the structure is made in an upper and lower section so that the two sections being hinged together, the lower section will be high enough that the hinge line between the two sections will be high enough that the upper wall section and the remainder of the structure can be easily rocked over an accumulation of material such as several inches depth of snow without interfering with the tipping of the structure. A still further object of the invention is to provide a structure of the kind mentioned which may or may not have a floor portion therein, other that just the ground or in other words just a dirt floor, but in any case the structure would be provided with wheel guide track elements and stops associated therewith to insure the proper positioning of a vehicle before the opened structure so that the opened structure can be unobstructively rocked or tipped to its closed position.

A still further object of the invention is to provide a structure of the kind mentioned that has adjustable ventilation means therein and also one that is counterbalanced so as to make for easy handling of the structure. A still further object of the invention is to provide a structure with the thought in mind that the structure can be easily handled or manipulated by manual effort, although the structure can be easily converted to a power or mechanically operated structure. These and other objects of the invention will become more apparent as the description progresses.

Now referring to the accompanying drawings in which similar numerals of reference designate the same parts throughout the several figures of the drawings.

FIG. 1 is a top plan view of the protective coverage device. FIG. 2 is an end view of the structure shown in FIG. 1, both ends of the structure being alike. FIG. 3 is a side view of the structure shown in FIG. 1. FIG. 4 is an enlarged, detail view showing the counter balance mechanism for the structure. FIG. 5 is an enlarged sectional view through the structure shown in FIG. 4, the view being as seen from the line V in FIG. 1 and looking in the direction of the arrows. FIG. 6 is a sectional view through the floor portion of the device and showing an alternate means of attaching the floor to the ground. FIG. 7 is an end view of the structure shown in FIG. 2 and showing an alternate counter balance means for the structure. FIG. 8 is an enlarged detail sectional view showing an upper corner fabrication of the housing device, the view being as seen from the line VIII—VIII in FIG. 2 and looking in the direction of the arrows. FIG. 9 is an enlarged detail sectional view showing the hinge and lock mechanism, the view being as seen from the line IX—IX in FIG. 3 and looking in the direction of the arrows.

In the drawings the device is shown as having a floor member 10, preferably held in place on the ground 11 by means of posts 12 driven into the ground at spaced apart intervals around the floor and having their upper ends abutting the underside of the floor 10, and having lag screws 13 passing through the floor and screwed one into each post top.

Superimposed on the floor is a housing element H having side 14 and 15 and ends 16 and 17 and a top 18. The side 14 is a short sub-wall 19 is fitted within the opening defined by the floor 10, end walls 16 and 17 and the lower edge of the side wall 14. The lower edge portion of the sub-wall 19 is turned at right angles to form an inwardly directed foot or leg portion, through which screws are passed and screwed into the floor element 10 to form a rigid mounting of the sub-wall 19 on the floor 10. The lower edge of the housing wall 14 abuts the upper edge or the sub-wall 19. The enclosure of the structure is carried on a pair of counter balance hinge structures A and B, each of which is constructed as shown in FIG. 5 wherein the hinge structure is contained within a box portion B, having side walls 21 and 22, that have circle tops over which is positioned a matching circle top housing element and side walls 23, the sides of which extend downwardly to meet the floor 10, the lower ends of the end walls 21 and 22 are shorter than the side walls 23 and are integral with or welded to the floor plate 24 and the side walls 23 over lap the edges of the floor plate 24 so as to form a weathertight box and the closure element 23 is all one piece and is removable from the end walls 21 and 22 to afford access to the interior of the enclosure.

In the enclosure is a hinge pin 25 which is journalled in the end walls 21 and 22 and wrapped around the hinge spring 25 is a helical counter spring 26. One end of the spring 26 is attached to one end wall 21 at the point 27, the other end of the spring 26 is attached to the flange member 28 at the point 29, the flange member 28 is mounted on the hinge pin 29 and is revolvable thereon and is rigidly fixable thereon in adjusted positions by means of a bolt 30 that passes through a hinge pin 25 and holes 31 and 32 in the hub portion 33 of the flange member 28.

On the outer end of the hinge pin 25 and adjacent the housing wall 22 is a hub element 34 that is a part of a flange 35 and the hub 34 is rigidly mounted on the hinge pin 35 by means of being welded thereto, or any other suitable attachable means may be employed and the flange 35 rests against the end wall 16 at one end of the structure and the same flange 35 in the companion hinge structure rests against the opposite end wall 17, and the flanges 35 are rigidly attached to their respective end walls 16 and 17 by any suitable means, such as rivets 36 in such a position that the hinge pin 25 in both hinge structures A and B are in alignment with each other and are positioned at a point immediately adjacent the abutting edges of the side wall 14 and the sub-wall 19 and the spring is so tensioned that its neutral position would be assured when the housing structure stands at an angle of approximately 45 degrees in the operation of opening and closing the structure as will later be described.

This adjustment of the spring 26 is such that the spring 26 becomes a counterbalancing force to oppose the dropping of the closure structure on either side of a line positioned at 45 degrees in a tipping movement of the housing structure H.

In the opposite side wall 15 is a panel section 37 that fits in a matching notch formation 38 in the lower edge portion of the side wall 15, and the upper edges of the panel section 37 are hinged attached at the points 39 and 40 to the lower edge portion of the notched portion 38 of the wall 15. At the lower edge of the panel section 37 is provided with an eye element 41 that is receivable in a slot 42 in a hasp leg 43, the hasp being attached to the floor 10 in the usual manner, so that a pad lock 24 can be looped through the eye 41 and locked to hold the housing element in a closed position as will readily be understood.

In FIG. 7 is shown an alternate counter balance means for the housing structure H in which a post 45 is set in the ground a spaced distance away from the housing H and on the upper end of the post 45 is supported a pulley 46 over which passes a flexible line 47, one end of which is attached to the housing G at the point 48 and on the other end of which is supported a counter balance weight 49 the height of the pole 45 and its spacing away from the housing element H is such that when the housing H is tipped past a line of 45 degrees the counterbalance weight will operate to prevent the falling of the housing element G in either the opening or closing direction of the tipping of the housing H.

In this adaption of the device, the hinge element A' and B' do not have the counterbalance springs 26 and the building merely rocks without the spring action as above described.

On the floor 10 of the structure is a pair of upwardly projecting guide elements 50 and 51 that are spaced apart so that in running a vehicle on the floor 10 the vehicle will be properly spaced so that when the housing portion H is rocked to a closed position, the vehicle will be properly spaced between the side walls 14 and 15 so that the housing H will properly lock over the vehicle without striking it. At one end of the guide elements 50 and 51 is positioned stop elements 52 and 53 that the wheels of the vehicle may strike and stop the movement of the vehicle so that in closing of the housing H the end walls 16 and 17 of the housing H will not strike the vehicle.

In order to narrow up the distance between the side walls 14 and 15 the hinged panel 37 is provided and by opening the panel 37 the housing H will rock over the cab portion of the vehicle and have plenty of clearance so that the lower edge portion of the side wall 15 will not strike the cab of the vehicle.

In FIGS. 1 and 2 is shown a spring leaf element 54, one end of which is rigidly attached to the floor element 10 and projects rearwardly and upwardly so that as the housing element H is rocked to its open position in the rear wall 14 will engage the outer end of the spring leaf element 54 and yieldably stop the rearward tipping motion of the housing H as will readily be understood.

Now to use the device the housing portion G may be rocked by hand to its open position, whereupon a vehicle V may be driven on the floor 10 astraddle the guide rails 50 and 51 until the front wheels strike the stops 52 and 53, whereupon the vehicle V will be properly positioned on the floor 10 so that the housing portion H may be rocked by hand over the vehicle V whereupon the panel 37 may be rocked to a closed position and the hasp leg 43 may be rocked over the eye 41 and a pad lock 44 may be placed therein and locked so that the vehicle V is housed and locked in the housing structure H.

Now as above described, the device is provided with a floor 10, if desired to cheapen the structure, the floor 10 may be dispensed with and the guide rails 50 and 51 and stops 52 and 53 may be built on the ground in the form of concrete curbs or wood guide rails, as will be readily understood.

Now having fully shown and described my invention, what I claim is:

1. A tippable housing device; said device having four walls and a cover thereover and carried by the said four walls, one of the said four walls being shorter in height than the other three walls, a sub-wall, said sub-wall being sufficient in height and long enough in length to fill the open space left by the shorter one of said walls resting on the said floor element, the lower edge portion of the said sub-wall also resting on the said floor element and being rigidly attached thereto to hold the sub-wall in a vertical position with the upper edge of the sub-wall abutting the lower edge of the shorter of the said four walls, a plurality of hinge means, each of said hinge means having a hinge pin therein that is in axial alignment each with the other and said axial alingnment also being in parallelism with the abutting edge of the sub-wall and the shorter one of the four walls of the said housing portion, all of said hinge means being attached to the said housing portion and to other parts of the device to hold the housing portion of the device in a tippable position about the said axial alignment of the said hinge pins, the housing wall opposite sub-wall having an openable and closable, centrally located notch portion therein to provide clearance space in the last mentioned wall for rocking the housing wall over an object to be housed in the housing portion of the device on the said floor element when the housing portion of the device is in its closed position, and counter balance means associated with all the foregoing defined structure to prevent the falling of the housing portion of the device to an open or closed position during the operation of opening or closing the housing portion of the device.

2. A tippable housing device; the structure, parts and arrangement thereof as defined in claim 1; said counterbalancing means being helical springs, one for and being positioned, one on each of the said hinge pins, one end of each helical spring being rigidly attached to a support for its respective hinge pin, the other end of each helical spring being rigidly fixed to a flange element that is adjustably fixed one on each hinge pin, other flange elements, one for and being rigidly fixed on the outer end of each hinged pin and being rigidly fixed, one on two opposite walls of the housing portion immediately adjacent the abutting edges of the said sub-wall and the shorter one of the four walls of the housing portion of the device, a second support for each hinge pin, said second support being rigidly attached to the said floor element of the device and revolvably supporting its respective hinge pin, the first said flange element on each hinge pin being revolvably adjustable thereon to tension its respective helical spring to offer resistance to the tipping of the said housing portion of the device on either side of a radial line selectively positioned at any point intermediate the perpendicular and horizontal.

3. A tippable housing device; the structure parts and arrangement thereof as defined in claim 1; said counterbalancing means being a pulley means, said pulley means being supported at a point higher than the height of the said housing portion of the device and at a point spaced a greater distance away from the hinged side of the housing portion of the device than the height of the said housing portion of the device, a flexible line, said flexible line passing over the said pulley means and having one end thereof attached to the upper mid-portion of the said housing portion of the device, a counterbalance weight, said counterbalance weight being suspended on the other end of the said flexible line for counterbalancing the said housing portion of the structure in its opening and closing movements.

4. A tippable housing device; the structure, parts and arrangement thereof as defined in claim 1; said counterbalancing means being a pulley means, said pulley means being supported at a point higher than the height of the said housing portion of the device and at a point spaced a greater distance away from the hinged side of the housing portion of the device than the height of the said housing portion of the device, a flexible line, said flexible line passing over the said pulley means and having one end thereof attached to the upper mid-portion of the said housing portion of the device, a counterbalance weight, said counterbalance weight being suspended on the other end of the said flexible line for counterbalancing the said housing portion of the structure in its opening and closing movements; buffer means, said buffer means being a yieldable element positioned intermediate the horizontal and vertical to engage the housing portion of the structure as the housing portion of the device is tipped to an open position.

5. A tippable housing device; the structure, parts and arrangement thereof as defined in claim 1; guide means, said guide means comprises raised guides, the outside faces of said guide means being spaced just far enough apart that the wheels of a vehicle will straddle the guide means to properly position the vehicle so that the housing portion of the device may be rocked to a closed position over the vehicle, and stops means adjacent the one end of the guide means to further properly station the vehicle before the housing portion of the device so that the housing portion of the device will clear the vehicle as the housing portion is rocked to its closed position.

References Cited
UNITED STATES PATENTS

| | | | |
|---|---|---|---|
| 2,321,477 | 6/1943 | France et al. | 52—66 |
| 3,009,211 | 11/1961 | Hansen et al. | 52—66 |

FOREIGN PATENTS

| | | |
|---|---|---|
| 846,458 | 1952 | Germany. |

JOHN E. MURTAGH, *Primary Examiner.*